United States Patent Office 2,950,596
Patented Aug. 30, 1960

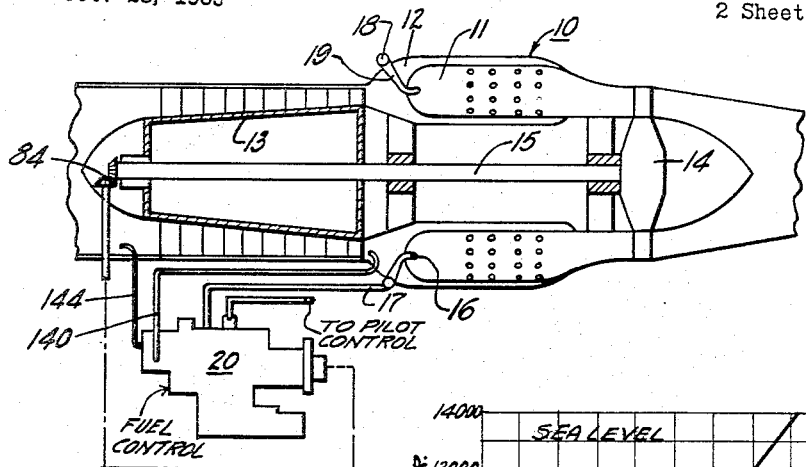
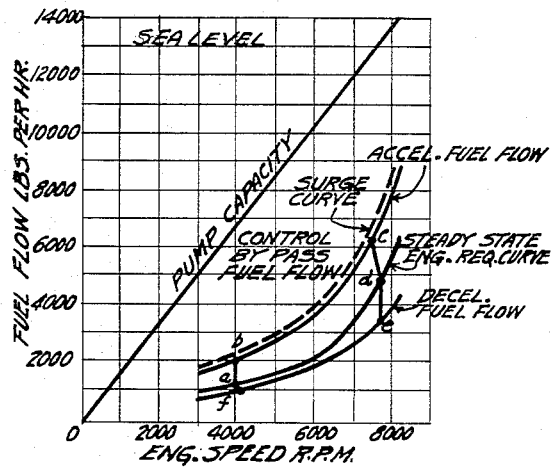
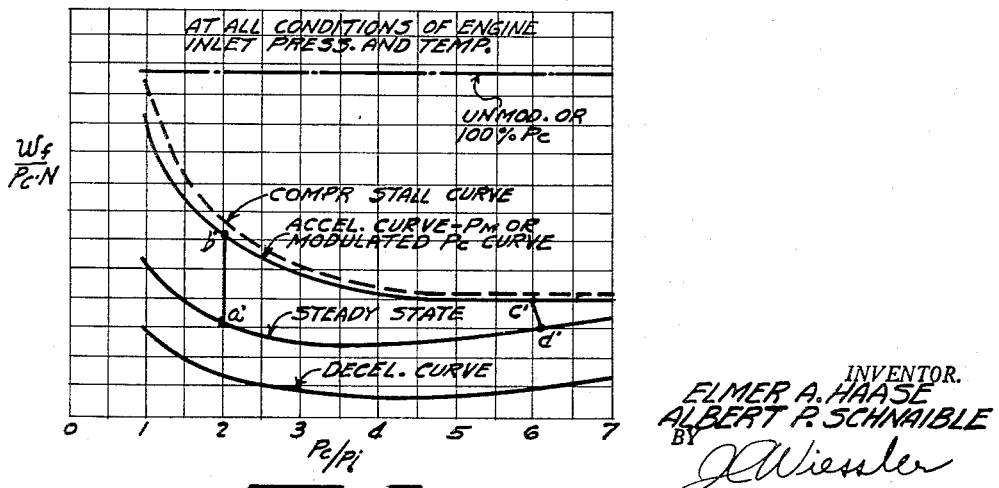

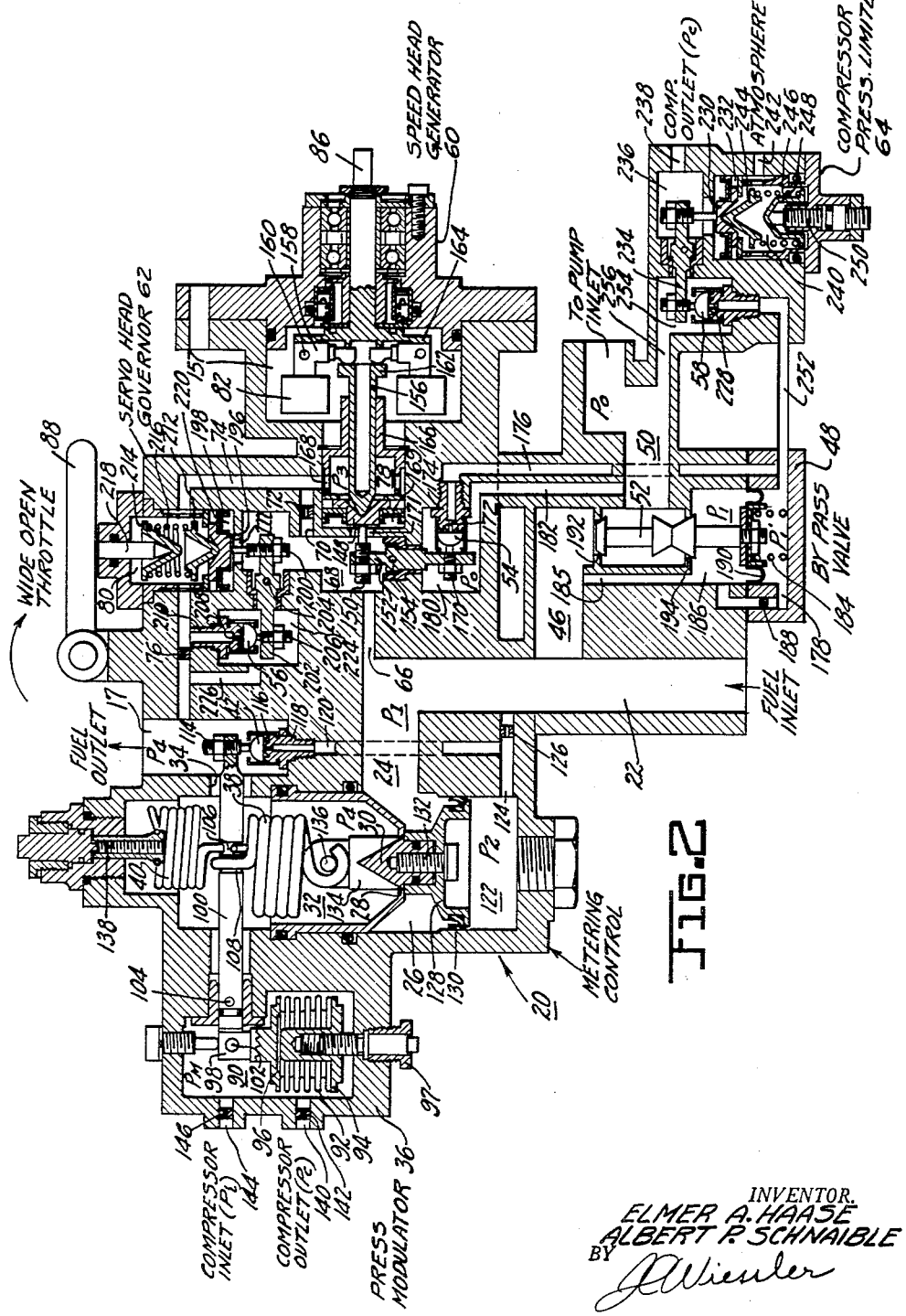

2,950,596

FUEL FEED AND POWER CONTROL SYSTEMS FOR GAS TURBINE ENGINES

Elmer A. Haase and Albert P. Schnaible, South Bend, Ind., assignors to The Bendix Corporation, a corporation of Delaware Filed Oct. 28, 1953, Ser. No. 388,754

11 Claims. (Cl. 60—39.28)

This invention relates to a fuel feed and power control system for gas turbine engines and more particularly for gas turbine engines adapted for the propulsion of aircraft, such as are now commonly known as turbo-jet and turbo-prop engines.

In acceleration of gas turbine engines, particularly those embodying an axial flow compressor, a phenomenon known as compressor stall or surge may be encountered in which the back pressure of the compressor exceeds some critical value, which usually results in a sudden and dractic reduction in the quantity of air delivered to the burners. If such a condition is encountered, the burner temperatures and the vibratory stresses induced in the compressor may become sufficiently high to cause serious damage to the engine unless there is an immediate and sharp reduction in the fuel delivery to the engine. In many present day high compression, high efficiency gas turbine engines it has been found that the stall or surge characteristic of the engine compressor limits the maximum amount of fuel flow which may be supplied to the engine throughout the greater part of the range of acceleration. Many of the fuel controls now in use on such engines include a mechanism which schedules the fuel flow during acceleration in such a way that the compressor stall region for the particular engine is avoided. However, the experience in this art has been that to avoid the compressor stall region during engine acceleration by means of a relatively simple control system, a substantial safety margin must be provided which necessarily decreases the rate at which the engine can be accelerated, particularly since the compressor stall region varies over a relatively wide range with variations in engine operating conditions. On the other hand, some controls have been designed which may more closely meet the compressor limitations but which are of such inherent complexity as to make them impractical for commercial use or involve great difficulties in manufacture, maintenance, dependability of operation and the like.

One of the principal reasons which has heretofore determined the relatively complex nature of fuel controls of the latter type is that such controls have incorporated relatively complex, and in many cases unreliable, temperature sensing mechanisms to meet the changes in the compressor stall characteristic which results from changes in engine inlet temperature. It is therefore one of the principal objects of the present invention to provide a relatively simple fuel control system for gas turbine engines which will permit a substantially optimum acceleration rate throughout the entire operating range of the engine.

Another important object of this invention is to provide a simplified fuel control system which meters fuel to the engine as a function of a certain engine parameter which uniquely defines the compressor stall characteristic at all engine operating conditions.

A further important object of this invention is to provide a fuel control system for engines of the type specified which is adapted to meter fuel during acceleration at a rate which closely follows the surge characteristic of the compressor at all engine operating conditions without the necessity of sensing that temperature condition according to which said compressor stall characteristic varies.

Another object of this invention is to provide a fuel control system for engines of the types specified which meters fuel as a function of $$\left(\frac{P_c}{P_i}\right) \cdot (P_c N)$$

where $$\frac{(P_c)}{(P_i)}$$

denotes the compressor pressure ratio, $(P_c)$ denotes compressor discharge pressure and N signifies engine speed.

A further object of this invention is to position an engine control member as a function of a modulated pressure $(P_m)$ which is controlled to vary as a predetermined function of an engine pressure ratio.

Another and more specific object of this invention is to position a valve member as a function of a pressure which exists between two bleeds in series and which pressure becomes a fixed percentage of the pressure existing upstream of the first of said series bleeds following the attainment of sonic flow through said bleed system.

The foregoing and other objects and advantages will become apparent in view of the following description taken in conjunction with the drawings, wherein:

Figure 1 is a sectional view, with some parts thereof shown in elevation, of a turbo-jet engine having operatively associated therewith a control embodying the features of the instant invention;

Figure 2 is a sectional schematic view of the fuel feed and power control system used on the engine of Figure 1; and Figures 3 and 4 are curve charts which illustrate the operational performance of the fuel feed and power control system shown in Figure 2.

Referring now to Figure 1, a gas turbine engine which is generally indicated at 10 includes a series of combustion chambers 11, mounted in a casing having a header or air intake section 12. A dynamic compressor 13 is shown of the axial flow type and is driven by means of a turbine 14 through a shaft 15; each of the combustion chambers is provided with a burner nozzle 16, to which metered fuel is supplied under pressure by way of a conduit 17, fuel manifold 18 and individual fuel lines 19. The conduit 17 receives metered fuel from a fuel control device generally indicated at 20 and shown primarily in sectional schematic in Figure 2, which will now be described.

Fuel enters the fuel control device 20 through an inlet conduit 22 at a pressure $P_1$ which is supplied to the control by a pump, not shown, the inlet of which is connected to a supply tank, not shown. The main supply of fuel to burner nozzles 16 flows from conduit 22 to metered fuel conduit 17 by way of a passage 24, chamber 26, a main metering restriction 28, the area of which is controlled by a main metering valve 30, and thence into a chamber 32 at metered fuel pressure $P_4$ and through a passage 34. The area of metering restriction 28 is controlled by the position of metering valve 30 which is determined by the action of a pressure modulator unit 36, springs 38 and 40 and a servo valve 42.

Fuel may also flow from conduit 22 through a branch conduit 46, a by-pass valve unit generally shown at 48, and a conduit 50 to the return or inlet side of the pump, not shown, at pressure $P_0$. The position of a by-pass valve 52 determines the quantity of fuel flow which will pass through the metering restriction 28 at any given position of metering valve 30. The by-pass valve 52 position, at any given engine operating condition, is controlled by the action of any one or more of servo valves 54, 56 or 58 which are respectively controlled by the speed head generator section 60, the servo head governor section 62, and the compressor pressure limiter unit 64.

Another fuel flow path, which is in parallel with the main passage flow through metering restriction 28, includes a branch conduit 66, a chamber 68, a passage 70 which includes a calibrated bleed 72, and a conduit 74 which includes a calibrated bleed 76. Conduit 74 is at a pressure $P_3$ and communicates with chambers 78 and 80 of the speed head generator 60 and the servo head governor 62 respectively. The speed head generator 60 includes one or more engine driven speed sensing weights 82 adapted to be suitably driven from the main engine shaft 15 of engine 10 by a gearing arrangement, such as schematically shown at 84, and a drive shaft 86. The speed head generator section functions to control the pressured drop across main metering valve 30 as a function of engine speed. The servo head governor 62 functions as an all-speed governor and is adjustable to any desired selected speed within the operating range of the engine by a pilot controlled throttle lever 88. The pressure modulator unit 36 is dominated by the copending application of Robert Rose, Serial No. 386,362, filed October 15, 1953 (common assignee), now Pat. No. 2,858,700, whereas the fuel control 20, including pressure modulator 36, is dominated by the copending application of Daniel Russ, Serial No. 388,293, filed October 26, 1953 (common assignee), now Pat. No. 2,848,869.

Now more specifically describing the various units generally referred to above of which the fuel control device 20 is comprised, the pressure modulator unit 36 consists of a modulated pressure ($P_m$) chamber 90 in which is mounted an expansible evacuated bellows 92 which is sealed from the surrounding atmosphere by cover plate members 94 and 96, said cover plate 94 being fixed or anchored in a selected position by adjustable screw member 97. Cover plate 96 includes an extended block section 98 suitably attached to a scale lever 100, as by pin 102. The scale 100 is fulcrumed at 104 and suitably grooved at 106 and 108 to retain the hooked ends of the trim spring 40 and scale spring 38 respectively. The servo valve 42 is of the half-ball type and is operatively connected to the right hand end of scale lever 100 by a stud 114. The servo valve 42 is adapted to control the effective area of an orifice 116 suitably disposed in an adapter member 118 which is connected to a conduit 120 through which said orifice communicates with a fuel pressure ($P_2$) chamber 122 and conduit 22 through a passage 124 and a calibrated bleed 126 respectively. The upper end of chamber 122 is bounded by a hub shaped reciprocable piston 128 adapted to retain an annular diaphragm type sealing means 130, said piston being fixedly connected to metering valve 30 by a stud 132. An extension member 134 of piston 128 is suitably connected to the lower end of scale spring 38 as at 136. Both scale spring 38 and trim spring 40 are tension springs, said latter mentioned spring being manually adjustable by an adjustment screw member 138.

The modulated pressure chamber 90 communicates with compressor discharge pressure ($P_c$) through a conduit 140 and a calibrated bleed 142 and with compressor inlet pressure ($P_1$) through a conduit 144 and a calibrated bleed 146. The size of the calibrated air bleeds 142 and 146 is very carefully selected so that said bleeds have a predetermined area ratio, the selection of which is determined by the particular compressor stall characteristic of any given engine of the type specified. It has been found that with a properly selected bleed area ratio, modulated $P_c$ pressure ($P_m$) varies directly as or is effectively a measure of some predetermined function of, compressor pressure ratio $$\frac{(P_c)}{(P_1)}$$

The specific desired function of compressor ratio for any given engine, as effectively measured by pressure $P_m$, is determined by the selected ratio of the bleed areas. The bleed areas are selected so that the velocity of the flow of air through the second bleed 146 reaches sonic at some predetermined compressor pressure ratio, which results in pressure $P_m$ becoming some predetermined fixed percentage of pressure $P_c$ at all compressor ratios above said predetermined ratio.

As modulated $P_c$ pressure ($P_m$) increases during, for example, acceleration of the engine, bellows 92 imposes an increasing force on the left hand end of scale lever 100 about fulcrum 104 which is directly proportional to pressure $P_m$ to control the effective area of orifice 116 by controlling the position of servo valve 42. As a result thereof, the area ratio between bleed 126 and orifice 116 varies to produce a decrease in chamber 122 pressure ($P_2$) resulting in a pressure drop across piston 128 ($P_1 - P_2$) which actuates metering valve 30 in an opening direction to an area at which scale spring 38 and trim spring 40 have been extended to produce an effective moment about fulcrum 104 which exactly balances the moment produced by bellows 92 about fulcrum 104, at which time servo valve 42 has assumed a position which results in effectively fixing the position of metering valve 30, and therefore the area of metering orifice 28, at some equilibrium position for a given value of modulated pressure $P_m$. If at any equilibrium condition of operation compressor pressor pressure ratio changes, for example, as a result of a change in compressor inlet temperature, pressure $P_m$ effectively measures this ratio change in accordance with the aforementioned predetermined function thereof to momentarily upset the balance of scale lever 100 which results in an actuation of metering valve 30 to a new position which reestablishes a force balance on said scale lever. It is therefore seen that the position of metering valve 30 defines an area at metering orifice 28 which varies directly as a function of compressor pressure ratio and that for any given fuel pressure head across said metering orifice a fuel flow to the burner nozzles 16 will result which is also proportional to said predetermined function of compressor ratio.

The speed head generator section 60 functions to generate a fuel metering head across metering restriction 28 which varies as the square of engine speed. The structure which comprises said speed head generator section includes a basically disc-shaped reciprocable piston element 148 which is normally held in abutting relation with the rounded end of a stud member 150 fixedly connected to one end of a servo valve lever 152 which is adapted to rock about a fulcrum 154, by a hollow needle shaped element 156. Engine speed sensing elements 82 are mounted in a chamber 157 on the outer ends of levers 158 which are fulcrumed at 160 and which impose a force on a flanged end 162 of element 156 proportional to the square of engine speed. The speed sensing weight levers 158 are suitably mounted on a flanged extension 164 of drive shaft 86 by the fulcrum pins 160. Needle shaped element 156 is held in axial alignment with piston element 148 by a flask shaped member 166 having ports 168 which communicate the chamber 78 at pressure $P_3$ with chamber 68 at pressure $P_1$ through conduit 70, bleed 72 and conduit 74. A piston chamber 169 communicates with chamber 68 through a port 171. The servo valve 54 is operatively connected to the lower end of lever 152 by a stud 170 and controls the effective area of an orifice 172 disposed in an adapted member 174 which is connected to one end of a conduit 176, said conduit 176 being connected at its opposite end to a chamber 178 for communicating fuel at pressure $P_1'$ from chamber 178 to conduit 50 at pump inlet pressure $P_0$, whenever servo valve 54 is unseated, by way of the orifice 172, a chamber 180 and conduit 182. Chamber 178 of by-pass valve section 48 contains a light rate spring 184 and also communicates with branch conduit 46 by way of a passage 185, a chamber 186 and a calibrated bleed 188, said chambers 178 and 186 being separated by a diaphragm member 190 which is secured to the by-pass valve 52 and controls the position thereof with respect to by-pass ports 192 and 194 as a function of the action of servo valve 54 in determining the $P_1-P_1'$ pressure drop.

It is apparent that at any given engine speed centrifugal weights 82 exert a force on piston 148 through member 156 which is proportional to the square of engine speed and which tends to actuate servo valve 54 to its seated position with respect to orifice 172, but the valve closing force is opposed by a pressure head $P_1-P_3$ across bleed 72 and piston 148 which is generated by the effect of by-pass valve action on pressure $P_1$, whereby a pressure head across piston 148 results which exactly balances the force output of centrifugal weights 82 at any equilibrium condition of engine operation. During a transient condition of engine operation, as during acceleration, the increasing force output of weights 82 tends to reduce the effective area of orifice 172 which tends to increase pressure $P_1'$ resulting in a closing movement of by-pass valve 52 and an increasing pressure $P_1$ which substantially instantaneously follows the increasing force output of weights 82 so as to produce a pressure drop across piston 148 which is at all times substantially proportional to existing engine speed. In other words, the by-pass valve 52 always seeks a position at which a quantity of fuel is by-passed through conduit 50 to the inlet of the pump which results in a fuel pressure drop across piston 148 which is proportional to the square of engine speed, inasmuch as the speed head generator controls said position of the by-pass valve as a result of its positional control of servo valve 54. The by-pass valve spring 184 is preferably of a low constant rate and is primarily used to determine the $P_1-P_1'$ pressure drop which must exist before the by-pass valve 52 begins to open. The same result may be obtained, for example, by eliminating the spring 184 and replacing the balanced by-pass valve 52, as shown, with a properly designed unbalanced valve. Inasmuch as the hydraulic circuit which comprises chamber 68, passage 70, bleed 72, conduit 74 and bleed 76 is in parallel with the main flow circuit through metering restriction 28, it is apparent that the fuel pressure head $P_1-P_4$ will also be proportional to the square of engine speed at all times, whereby the flow through metering restriction 28 at any given area thereof is directly proportional to engine speed.

The servo head governor unit 62 comprises a reciprocable piston element 196 mounted in a cylinder 198 and abutting the rounded end of a stud 200 which is secured to a rockable lever 202 fulcrumed at 204, said lever being attached to the servo valve 56 at its opposite end by stud 206, which servo valve may effectively control the area of an orifice 208 included within adapter member 210 and communicating therethrough with conduit 74, all of which servo head governor structure may be of substantially the same basic design as the corresponding structure of the speed head generator 60. A pair of spring retainer elements 212 and 214 are urged in opposite directions by a governor spring 216 and are held thereby in respective abutting relation with piston 196 and a governor reset member 218 which is actuable by the pilot controlled throttle lever 88 to vary the degree of compression of the governor spring 216 from a predetermined minimum to a predetermined maximum amount, which range of spring compression corresponds to the allowable range of engine speed from zero to maximum r.p.m. with any engine speed within said range being determinable by a selected position of the pilot's control lever. A chamber 220 adjacent the lower end of piston 196 communicates with chamber 68 at pressure $P_1$ through a port 222. It is therefore seen that the speed pressure head $P_1-P_3$ is imposed across piston 196 and acts in opposition to governor spring 216 at any given setting thereof. At any given condition of equilibrium operation the generated speed pressure head acting across piston 196 produces a force on said piston which is equal and opposite to the governor spring force, thereby fixing a position of the servo valve 56 which establishes such an effective area of orifice 208 to bleed down $P_3$ pressure to the pressure $P_4$ in fuel outlet conduit 17, through a chamber 224, a conduit 226 and the conduit 74 downstream of bleed 76, as is necessary to establish that position of piston 148 and servo valve 54 which properly positions by-pass valve 52 to control the metered pressure head $P_1-P_4$ across metering restriction 28 so as to meter that quantity of fuel to burner nozzles 16 which will maintain said engine set speed.

If the pilot now rests governor spring 216 from the assumed steady state point of operation to a higher engine speed setting, the servo valve 56 closes orifice 208 thereby increasing $P_3$ pressure which results in a closing movement of servo valve 54 and by-pass valve 52 to increase the $P_1-P_4$ pressure drop and accelerate the engine. When the new speed setting of governor spring 216 is attained the pressure drop across piston 196, being proportional to the existing speed, overcomes spring 216 and moves servo valve 56 to an open position which instantaneously opens servo valve 54 and by-pass valve 52 to quickly decrease pressure drop $P_1-P_4$ and governor the engine to its equilibrium condition at the new selected speed.

It is therefore seen that the speed head generator unit 60 functions to control fuel flow through metering restriction 28 as a direct function of engine speed, being modified in its control of by-pass valve 52 by the action of the all-speed servo head governor unit 62 the action of which allows the engine to be accelerated and governs said engine to any speed that may be selected by the pilot regardless of changes in engine operating conditions. Obviously, engine driven speed sensing weights such as those shown at numeral 82 may be substituted for the hydraulic head sensitive piston 196 to produce the same governing function.

The compressor pressure limiter unit 64 is a device adapted to override the positional control of by-pass valve 52 by the speed generator unit 60 and the servo head governor 62 whenever compressor discharge pressure exceeds a predetermined maximum safe value and is, therefore, operative to affect fuel flow to the burners only under emergency conditions. The compressor pressure limiter is adapted to control the effective area of orifice 228 by mechanism which in most respects may be similar to the servo valve control means above described with respect to the servo head governor 62. As shown, said servo valve control mechanism comprises a piston 230 reciprocable in a cylinder 232 and suitably attached to and adapted to control the action of servo lever 234, to which the servo valve 58 is also operatively connected. A chamber 236 communicates with compressor discharge pressure through conduit 238 while a chamber 240 communicates with the atmosphere through a conduit 242, said chambers being sealingly separated by the piston 230. A pair of spring retainers 244 and 246 are urged apart by a spring 248 which is mounted therebetween, said spring retainers respectively abutting the piston 230 and one end of an adjustment screw 250. The adjustment screw 250 may be set to compress spring 248 to any desired amount which effectively determines, at any given altitude, the maximum compressor discharge pressure which may be attained. The servo valve 58 remains seated on orifice 228 under all conditions of engine operation except that at which a compressor discharge pressure is attained which overcomes the combined force of spring 248 and the atmospheric pressure which act on piston 230, thereby opening servo valve 58 which dumps $P_1'$ pressure in chamber 178 to pump inlet pressure $P_0$ in conduit 50 through a passage 252, orifice 228, a chamber 254 and a passage 256. This action results in a sudden opening of by-pass valve 52, irrespective of the valve position at that time demanded by the speed head generator section 60 and the servo head governor unit 62, whereby a sudden decrease in fuel flow to the engine results and compressor discharge pressure immediately drops to a safe value, following which the servo valve 58 again closes and returns control of the by-pass valve 52 to the head generator and governor units 60 and 62.

In operation, fuel flow ($W_f$) to the burner nozzles is metered at the metering restriction 28 to vary as a function ($f$) of compressor pressure ratio $$\frac{(P_c)}{(P_1)}$$

times compressor discharge pressure ($P_c$) times engine speed (N). As hereinbefore described, the direct proportional relationship between fuel flow and engine speed is obtained by the speed head generator and by-pass valve control of the $P_1$—$P_4$ pressure drop across said restriction, while the servo head governor unit 62 functions to govern the engine to any pilot selected speed as a result of its effect on the speed head generator and by-pass valve units. Also, as hereinbefore described, the contoured metering valve 30 controls the area of metering restriction 28 as a direct function of compressor pressure ratio times compressor discharge pressure. It is therefore apparent that the fuel flowing through metering restriction 28 will vary in accordance with the above stated relation. Symbolically, this relation may be easily derived as follows: $W_f \alpha f(P_m) \cdot N$. From the well known relationship of flow through bleeds in series it is apparent that $$\left(\frac{P_m}{P_c}\right) \alpha f\left(\frac{P_c}{P_i}\right)$$

where the function ($f$) is determined by the particular ratio of the areas of air bleeds 142 and 146.
Or $$P_m \alpha f\left(\frac{P_c}{P_i}\right) \cdot P_c$$

Therefore $$W_f \alpha f\left(\frac{P_c}{P_i}\right) \cdot P_c \cdot N$$

Or $$\frac{W_f}{P_c N} \alpha f\left(\frac{P_c}{P_i}\right)$$

The applicants have found that the dimensionless or generalized plot of $$\frac{W_f}{P_c N} \text{ vs. } \frac{P_c}{P_i}$$

defines, in a unique manner, the compressor stall characteristic and the steady state operating characteristic of many engines of the type specified.

This relationship is illustrated in the curve chart of Figure 3 wherein the compressor stall and steady state curves shown uniquely define the compressor stall and steady state running characteristics irrespective of changes in engine operating conditions; i.e. irrespective of changes in engine inlet pressure and/or temperature. The applicants have further found that the particular relationship defined by Figure 3 with respect to the compressor stall and steady state curves are dimensionless with respect to variations in engine inlet pressure and/or temperature, and that therefore the single compressor stall and steady state curves illustrated define the engine operating characteristics for all engine inlet conditions.

If full or unmodulated pressure $P_c$ were applied to the bellows 92, the fuel control 20 would function to produce the characteristic shown in Figure 3 by the horizontal unmodulated $P_c$ curve. By a proper selection of the ratios of the areas of air bleeds 142 and 146, as hereinbefore described, the unmodulated $P_c$ characteristic is warped by the resulting modulation of said pressure so as to closely follow the compressor stall curve as shown by the illustrated acceleration curve. In an engine which has a compressor stall curve such as shown in Figure 3, the bleed area ratio would be chosen so that the air flow through the second bleed 146 attained sonic velocity at a compressor pressure ratio of 4.5, at which ratio the acceleration curve flattens out to follow the compressor stall curve. After critical or sonic velocity is attained through the bleed system further increase in compressor ratio has no effect on the $$\frac{W_t}{P_c N}$$

parameter, as illustrated in Figure 3, inasmuch as $P_m$ maintains a constant percentage relationship to $P_c$ throughout the critical flow range. The tension of the trim spring 40 is adjustable by screw 138 to vary the overall elevation of the acceleration curve so that it will follow the compressor stall curve as closely as is practicable. The area ratio of the bleeds can, of course, be varied as required to attain a condition of critical or sonic flow at greater or lesser compressor ratios than as illustrated in Figure 3, thereby resulting in a relatively simple control mechanism which is easily adaptable to engines having different compressor stall characteristics than illustrated in Figure 3.

Referring now to Figure 4, a curve chart is illustrated in which the curves of Figure 3 have been transposed to indicate typical operating characteristics at sea level standard conditions. If it is assumed that the engine is operating at steady state point $a$, the fuel flow being metered by control 20 is exactly equal to that quantity necessary to produce that amount of engine torque which the engine requires to run at that speed. If now the pilot should desire to accelerate to point $d$ he resets the control lever 88 to a position which corresponds to the power condition which exists at point $d$, which in turn resets the governor spring 216 to govern the engine to point $d$. Simultaneously therewith servo valve 56 closes orifice 208 thereby increasing pressure $P_3$ in chamber 78 and resulting in a partial closure of servo valve 54 which establishes a higher $P_1'$ pressure in by-pass valve chamber 178, thereby moving by-pass valve 52 toward closed position to increase pressure $P_1$ and fuel flow to the acceleration curve along line $a$—$b$. At point $b$ the metering valve 30 has not moved to change the area of restriction 28 inasmuch as the compressor pressure ratio is substantially the same at point $b$ as at point $a$ so that the fuel flow increase from point $a$ to point $b$ is determined by the existing area of metering restriction 28 and the sudden increase in fuel flow due to the sudden increase in pressure drop $P_1$—$P_4$ resulting from the resetting of servo head governor 62. From point $b$ to point $c$ the fuel flow increases at such a rate as to closely follow the compressor surge curve, as described with respect to Figure 3. During this period of transience in engine speed and fuel flow the metering valve 30 moves in an opening direction at a rate which is proportional to changing pressure $P_m$, while unit 60 generates a pressure head $P_1$—$P_4$ across said increasing area which is proportional to the square of engine speed, as hereinbefore described. The new speed setting having been attained at point $c$, the pressure head across piston 196 of the servo head governor attains a value at point $c$ which overcomes the force of governor spring 216 and moves servo valve 56 toward open position thereby decreasing pressure $P_3$ in chamber 78 which results in an opening movement of servo valve 54 and by-pass valve 52 to decrease fuel flow and govern the engine to point $d$. At point $d$ the fuel control mechanisms are again in equilibrium, the metering valve 30 having been actuated to a position at which scale spring 38 is in balance with bellows 92 to control the position of servo valve 42 which maintains said position of the metering valve 30. The acceleration schedule just described is illustrated in Figure 3 by the curve through points $a'—b'—c'—d'$. Governor 62, speed head generator 60 and pressure modulator 36 now function conjointly to produce a fuel flow through metering restriction 28 which maintains the engine at a steady state condition for any given setting of the governor 62 irrespective of changes in engine inlet pressure and/or temperature.

During a deceleration of the engine, as from point $d$ to point $a$, the reverse of the foregoing operations takes place and the engine decelerates at sea level along a curve $d—e—f—a$.

Although only one embodiment of the invention has been illustrated and described, it will be apparent to those skilled in the art that various changes in form and relative arrangement of parts may be made to suit requirements.

We claim:

1. In a fuel control system for gas turbine engines having a burner and a compressor, a first fuel flow regulating means for metering fuel to the burner including a fuel metering restriction and valve means for controlling said restriction, a second fuel flow regulating means for controlling the pressure drop across said first regulating means, means responsive to an engine operating parameter operatively connected to one of said regulating means for controlling fuel flow to the burner as a function of said parameter, said parameter being an indication of engine speed condition throughout the operating range of the engine and compressor pressure modulating means operatively connected to the other of said regulating means for controlling fuel flow to the burner as a function of a compressor pressure ratio irrespective of variations in engine operating conditions including a pressure responsive means, a chamber, a fluid connection between said chamber and said pressure responsive means, a first passage connecting said chamber with a first pressure derived from the compressor and a second passage connecting said chamber with a second pressure associated with the compressor, said first and second connecting passages having such a predetermined fixed area relation that sonic flow through said second connecting passage is attained at a predetermined ratio of said first and second pressures and below which ratio a pressure is produced in said chamber which varies as a function of the ratio of said first and second pressures.

2. In a fuel control system for gas turbine engines having a burner and a compressor, a first fuel flow regulating means for metering fuel to the burner including a fuel metering restriction and valve means for controlling said restriction, a second fuel flow regulating means for controlling the pressure drop across said first regulating means, engine speed sensing means operatively connectd to one of said regulating means for controlling fuel flow to the burners as a function of engine speed at all times during transient operating conditions of the engine, and means operatively connected to the other of said regulating means for controlling fuel flow to the burner as a function of compressor ratio including a chamber, a fluid pressure responsive member disposed in said chamber, and means for modulating the fluid pressure in said chamber including a first orifice for connecting said chamber with a pressure derived from the compressor and a second orifice for connecting said chamber with compressor inlet pressure, said first and second orifices having such a predetermined area ratio that sonic flow through said second orifice is attained at a predetermined ratio of said compressor pressures and below which predetermined ratio a pressure is produced in said chamber which varies as a function of the compressor pressure ratio.

3. In a fuel control system for gas turbine engines having a burner and a compressor, a first fuel flow regulating means for metering fuel to the burner including a fuel metering restriction and valve means for controlling said restriction, a second fuel flow regulating means for controlling the pressure drop across said first regulating means as a function of engine speed conditions through the operating range of the engine, and means operatively connected to one of said regulating means for controlling fuel flow to the burner as a function of compressor pressure ratio including a pressure responsive member, a chamber, a fluid connection between said chamber and said pressure responsive member, a first restriction for connecting said chamber with a pressure source indicative of compressor discharge pressure and a second restriction in series with said first restriction for connecting said chamber with a pressure source indicative of compressor inlet pressure, said first and second restrictions having such a predetermined area ratio that critical or sonic flow velocity is attained through said second restriction at a predetermined compressor pressure ratio, whereby said member responds to a pressure in said chamber which varies as a function of compressor pressure ratio below said predetermined ratio and which varies as a function of compressor discharge pressure above said predetermined ratio.

4. A fuel control device for gas turbine engines having a burner and a compressor comprising a first fuel flow regulating means for metering fuel to the burner including a fuel metering restriction, valve means adapted to control the effective area of said restriction, a modulated fluid pressure chamber, a device responsive to the fluid pressure in said chamber and operatively connected to said valve means for controlling the position thereof as a function of said fluid pressure, and a pair of passages in series having a predetermined area relation for connecting a source of pressure derived from the compressor with a source of compressor inlet pressure through said chamber in such a way that a critical flow velocity of said fluid is attained in the passage connected to said source of compressor inlet pressure at a predetermined ratio of said compressor pressures and below which predetermined ratio a fluid pressure is produced in said chamber which varies as a function of the compressor pressure ratio at all engine operating conditions, and a second fuel flow regulating means for controlling the pressure drop across said metering restriction as a function of an engine operating parameter other than temperature or pressure, whereby the fuel control device meters fuel during acceleration of the engine at a rate which closely follows the stall characteristic of the compressor at all engine operating conditions without sensing that temperature or pressure condition according to which said stall characteristic varies.

5. A fuel control device for gas turbine engines having a burner and a compressor comprising a first fuel flow regulating means for metering fuel to the burner including a modulated gas pressure chamber, means responsive to the pressure in said chamber, first and second passage means connecting said chamber with first and second sources of gas pressure which are associated with the compressor, said first and second passage means having such a predetermined area relation that at some predetermined condition of engine operation the pressure in said chamber becomes a substantially fixed percentage of the pressure at one of said sources and valve means for controlling the flow of fuel to the burner operatively connected to said pressure responsive means, and a second fuel flow regulating means for controlling the pressure drop across said first regulating means including by-pass valve means and a speed head generator operatively connected to said by-pass valve means for controlling the position thereof as a function of engine speed throughout the speed range of the engine.

6. A fuel control device as claimed in claim 5 having an adjustable all-speed governor means operatively connected to said by-pass valve means and a manually operable power control member connected to and adapted to reset said governor means to govern the engine at any given selected speed.

7. A fuel control device for gas turbine engines having a burner and a compressor comprising a fuel metering restriction, a valve for controlling the area of said restriction, means operatively connected to said valve for controlling the position thereof including a modulated pressure chamber, a device responsive to the pressure in said chamber and means for modulating the pressure in said chamber in such a manner that said pressure varies as a functions of the ratio of pressures across the compressor, a second valve means for controlling the pressure head across said metering restriction, an engine speed head generator operatively connected to said second valve means for controlling said second valve means as a function of engine speed under all speed conditions within the operating range of the engine, and a compressor pressure limiter also operatively connected to said second valve means for overriding speed head generator control of said second valve means whenever compressor discharge pressure exceeds a predetermined maximum value.

8. In a fuel control system for a combustion engine having a burner, a fuel pump, a fuel conduit connected to a supply fuel from the pump to the burner, a first fuel flow regulating means for controlling the flow of fuel to the burner including a fuel metering restriction in series flow with said conduit and valve means for controlling said restriction, a second fuel flow regulating means for controlling the pressure drop across said fuel metering restriction including a fuel by-pass conduit connected between said fuel conduit and a low pressure source of fuel and a by-pass valve operatively connected to said by-pass conduit for controlling fuel flow therethrough, means responsive to an engine generated variable condition of operation which varies with engine power output over the operating range of the engine operatively connected to one of said regulating means for controlling fuel flow to the burner as a function of said variable condition of operation, and pressure modulator means operatively connected to the other of said regulating means for controlling fuel flow to the burner as a function of the ratio between two fluid pressures associated with the engine including a chamber, a pressure responsive member responsive to the fluid pressure in said chamber, and means for modulating the fluid pressure in said chamber in such a way that said pressure varies as a function of said ratio of pressures up to a predetermined ratio thereof including a first restricted passage communicating said chamber with one of said two fluid pressures, a second restricted passage communicating said chamber with the other of said two fluid pressures, said first and second restricted passages having a predetermined fixed area relationship whereby the flow of said fluid attains sonic velocity through said second passage at said predetermined ratio of said two fluid pressures.

9. In a fuel control system for a combustion engine having a burner and a compressor, a fuel pump, a fuel conduit connected to supply fuel from the pump to the burner, a first fuel flow regulating means for controlling the flow of fuel to the burner including a fuel metering restriction in series flow with said conduit and valve means for controlling said restriction, a second fuel flow regulating means for controlling the pressure drop across said fuel metering restriction including a fuel by-pass conduit connected between said fuel conduit and a low pressure source of fuel, and a by-pass valve operatively connected to said by-pass conduit for controlling fuel flow therethrough, means responsive to an engine generated variable condition of engine operation which varies with engine power output over the operating range of the engine operatively connected to one of said regulating means for controlling fuel flow to the burner as a function of said variable condition of operation, and compressor pressure modulating means operatively connected to the other of said regulating means for controlling fuel flow to the burner as a function of compressor pressure ratio including a chamber, pressure responsive means responsive to the fluid pressure in said chamber, first passage means connecting said chamber with a first pressure derived from the compressor and second passage means connecting said chamber with a second pressure associated with said compressor, said first and second passage means having such a predetermined fixed area relationship that sonic flow through said second passage means is attained at a predetermined ratio of said first and second pressures and below which predetermined ratio a pressure is produced in said chamber which varies as a function of the ratio of said first and second fluid pressures.

10. In a fuel control system for combustion engines having a burner and a compressor, a fuel pump, a fuel conduit connected to supply fuel from the fuel pump to the burner, a first fuel regulating means for controlling the flow of fuel to the burner including a fuel metering restriction in series flow with said conduit and valve means for controlling said restriction, a second fuel regulating means for controlling the pressure drop across said fuel metering restriction including a fuel by-pass conduit connected between said conduit and the inlet to said pump and a by-pass valve operatively connected to said by-pass conduit for controlling fuel flow therethrough, means responsive to the speed of the engine throughout the operating range of the engine operatively connected to one of said regulating means for controlling fuel flow to the burner as a function of engine speed, and means operatively connected to the other of said regulating means for controlling fuel flow to the burner as a function of compressor pressure ratio including a gas pressure chamber, pressure responsive means responsive to the pressure in said chamber, and means for modulating the pressure in said chamber including a first orifice through which said chamber communicates with a compressor generated pressure and a second orifice through which said chamber communicates with compressor inlet pressure, said first and second orifices having such a predetermined fixed area ratio that sonic flow through said second orifice is attained at a predetermined ratio of said compressor pressures and below which predetermined ratio a pressure is produced in said chamber which varies as a function of the compressor pressure ratio.

11. In a fuel control system for gas turbine engines having a burner and a compressor, a fuel pump, a fuel conduit connected to supply fuel from the pump to the burner, a first fuel flow regulating means for controlling the flow of fuel to the burner including a fuel metering restriction in series with said said conduit and valve means for controlling said restriction, a second fuel flow regulating means for controlling the pressure drop across said fuel metering restriction including a fuel by-pass conduit connected to said fuel conduit, a by-pass valve operatively connected to said by-pass conduit for controlling fuel flow therethrough, and means responsive to the speed of the engine operatively connected to said by-pass valve for controlling said pressure drop as a function of engine speed throughout the operating range of the engine, and means operatively connected to said first fuel regulating means for controlling fuel flow to the burner as a function of compressor pressure ratio including a chamber, a pressure responsive member responsive to the pressure in said chamber, a first orifice through which said chamber communicates with compressor discharge pressure, a second orifice in series flow relationship with said first orifice through which said chamber communicates with compressor inlet pressure, said first and second orifices having such a predetermined fixed area ratio that sonic flow velocity is attained through said second restriction at a predetermined compressor pressure ratio and below which predetermined ratio the pressure in said chamber is caused to vary as a function of compressor pressure ratio.

References Cited in the file of this patent

UNITED STATES PATENTS

| | | |
|---|---|---|
| 2,622,393 | Edwards et al. | Dec. 23, 1952 |
| 2,643,514 | Jubb | June 30, 1953 |
| 2,645,240 | Drake | July 14, 1953 |
| 2,649,686 | Lawrence et al. | Aug. 25, 1953 |
| 2,668,416 | Lee | Feb. 9, 1954 |
| 2,674,847 | Davies et al. | Apr. 13, 1954 |
| 2,694,290 | Best | Nov. 16, 1954 |
| 2,741,089 | Jagger | Apr. 10, 1956 |
| 2,746,242 | Reed | May 22, 1956 |
| 2,778,191 | Thompson | Jan. 22, 1957 |
| 2,846,846 | Mock | Aug. 12, 1958 |
| 2,848,869 | Russ | Aug. 26, 1958 |
| 2,873,576 | Lombard | Feb. 17, 1959 |

OTHER REFERENCES

Zucrow: "Jet Propulsion and Gas Turbines," 563 pages, July 14, 1948, New York, John Wiley & Sons Co.